United States Patent
Meincke, II

(10) Patent No.: US 11,691,300 B1
(45) Date of Patent: Jul. 4, 2023

(54) SHOULDER JOINT AND BRAKE FOR A ROBOTIC ARM

(71) Applicant: Empower Robotics Corporation, Lexington, MA (US)

(72) Inventor: John W. Meincke, II, Medfield, MA (US)

(73) Assignee: Empower Robotics Corporation, Lexington, MA (US)

( * ) Notice: Subject to any disclaimer, the term of this patent is extended or adjusted under 35 U.S.C. 154(b) by 519 days.

(21) Appl. No.: 16/818,724

(22) Filed: Mar. 13, 2020

Related U.S. Application Data

(60) Provisional application No. 62/818,019, filed on Mar. 13, 2019.

(51) Int. Cl.
*B25J 19/00* (2006.01)
*B25J 17/00* (2006.01)
*F16D 55/38* (2006.01)
*F16D 125/64* (2012.01)
*F16D 121/14* (2012.01)

(52) U.S. Cl.
CPC ........... *B25J 19/0004* (2013.01); *B25J 17/00* (2013.01); *F16D 55/38* (2013.01); *F16D 2121/14* (2013.01); *F16D 2125/64* (2013.01); *F16H 2706/00* (2013.01)

(58) Field of Classification Search
CPC ..... B25J 19/0004; B25J 9/0006; F16D 55/38; F16D 55/39; F16D 2125/64; A61H 1/0281
See application file for complete search history.

(56) References Cited

U.S. PATENT DOCUMENTS

| | | | | |
|---|---|---|---|---|
| 2,771,966 | A | * | 11/1956 | Davey ..................... F16D 55/39 188/71.6 |
| 3,289,797 | A | * | 12/1966 | Brzezinski ............ F16D 65/567 188/196 R |
| 3,682,279 | A | * | 8/1972 | Palme ..................... F16D 59/02 188/71.9 |
| 4,798,269 | A | * | 1/1989 | Lindner .................. F16D 55/28 188/71.7 |
| 5,186,287 | A | * | 2/1993 | Lindner .............. F16D 65/0006 188/72.3 |
| 5,421,436 | A | * | 6/1995 | Lindner .............. F16D 65/0006 188/73.38 |
| 10,596,712 | B2 | * | 3/2020 | Chiu ..................... F16D 63/006 |

(Continued)

*Primary Examiner* — Jake Cook
(74) *Attorney, Agent, or Firm* — Joseph S. Spano; Spano Law Group

(57) ABSTRACT

Mechanisms to realize lightweight rotational joints having passive, high torque braking in one or more degrees of freedom are presented herein. In addition, robotic systems incorporating one or more rotational joints with passive, high torque braking as described herein are also presented. Each degree of freedom includes a spring element to preload the braking assembly to maintain high torque braking. The force generated by the spring is multiplied to a much larger force applied to the braking elements by a lever structure and an eccentric mechanism. A human user manually displaces the spring element and effectively reduces braking torque to a desired amount. In a further aspect, a two degree of freedom mechanical shoulder joint and brake device is disposed in a structural path between the harness assembly of an upper body support system and a surface of a working environment.

19 Claims, 8 Drawing Sheets

(56) References Cited

U.S. PATENT DOCUMENTS

2013/0306425 A1* 11/2013 Clesceri .................. F16D 7/027
 192/56.1
2019/0175435 A1* 6/2019 Sasaki ..................... B66F 19/00

* cited by examiner

SHOULDER JOINT AND BRAKE FOR A ROBOTIC ARM

CROSS REFERENCE TO RELATED APPLICATIONS

The present application for patent claims priority under 35 U.S.C. § 119 from U.S. provisional patent application Ser. No. 62/818,019, entitled "Passive Robotic Arm Shoulder Joint And Brake," filed Mar. 13, 2019, the subject matter of which is incorporated herein by reference in its entirety.

TECHNICAL FIELD

The described embodiments relate to systems and methods for transmitting moments through a mechanical structure including a shoulder joint and brake to achieve a range of mechanical motion in a compact envelope.

BACKGROUND INFORMATION

In many applications, mechanical joints are employed to transmit forces and moments through a mechanical structure. However, transmission of forces and moments with passive, high torque braking over a relatively large range of motion with relatively low overall weight and brake control force can be challenging. Improvements in the design of systems including mechanical joints with passive, high torque braking are desired.

SUMMARY

Mechanisms to realize lightweight rotational joints having passive, high torque braking in one or more degrees of freedom are presented herein. In addition, robotic systems incorporating one or more rotational joints with passive, high torque braking as described herein are also presented.

In some embodiments, a robotic structure includes a lightweight rotational joint having passive, high torque braking in two degrees of freedom to emulate a shoulder joint. Each degree of freedom includes a shaft with high torque braking. A spring element preloads the braking assembly to maintain high torque braking of the shaft. The tensile force applied by the spring is multiplied to a much larger force applied to the braking elements. The tensile force applied by the spring is multiplied by an eccentric mechanism. The force generated by the eccentric mechanism is, in turn, multiplied by a lever mechanism to apply a large braking force to the braking elements. In addition, a human user is able to manually displace the spring element and effectively relieve the braking torque. Thus, a human use is able to manually release the preload of the braking assembly, allowing the shaft to rotate freely, or with reduced resistance.

In another aspect, each degree of freedom of the mechanical shoulder joint and brake device includes a stopper structure to limit the range of rotation of a particular rotational joint.

In another aspect, a friction enhancing material is bonded to one or more of the brake plates to increase the braking torque induced at each rotational joint for a given brake force.

In a further aspect, each upper body support assembly of an upper body support system includes a mechanical shoulder joint and brake device coupled to a frame of the upper body support system as described herein.

In this manner, a mechanical shoulder joint and brake device is disposed in each structural path between the harness assembly and a surface of a working environment.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Mechanisms to realize lightweight rotational joints having passive, high torque braking in one or more degrees of freedom are presented herein. In addition, robotic systems incorporating one or more rotational joints with passive, high torque braking as described herein are also presented.

In some embodiments, a robotic structure includes a lightweight rotational joint having passive, high torque braking in two degrees of freedom to emulate a shoulder joint. Each degree of freedom includes a shaft with high torque braking. A spring element preloads the braking assembly to maintain high torque braking of the shaft. The tensile force applied by the spring is multiplied to a much larger force applied to the braking elements. The tensile force applied by the spring is multiplied by an eccentric mechanism. The force generated by the eccentric mechanism is, in turn, multiplied by a lever mechanism to apply a large braking force to the braking elements. In addition, a human user is able to manually displace the spring element and effectively relieve the braking torque. Thus, a human use is able to manually release the preload of the braking assembly, allowing the shaft to rotate freely, or with reduced resistance.

Figure 1:
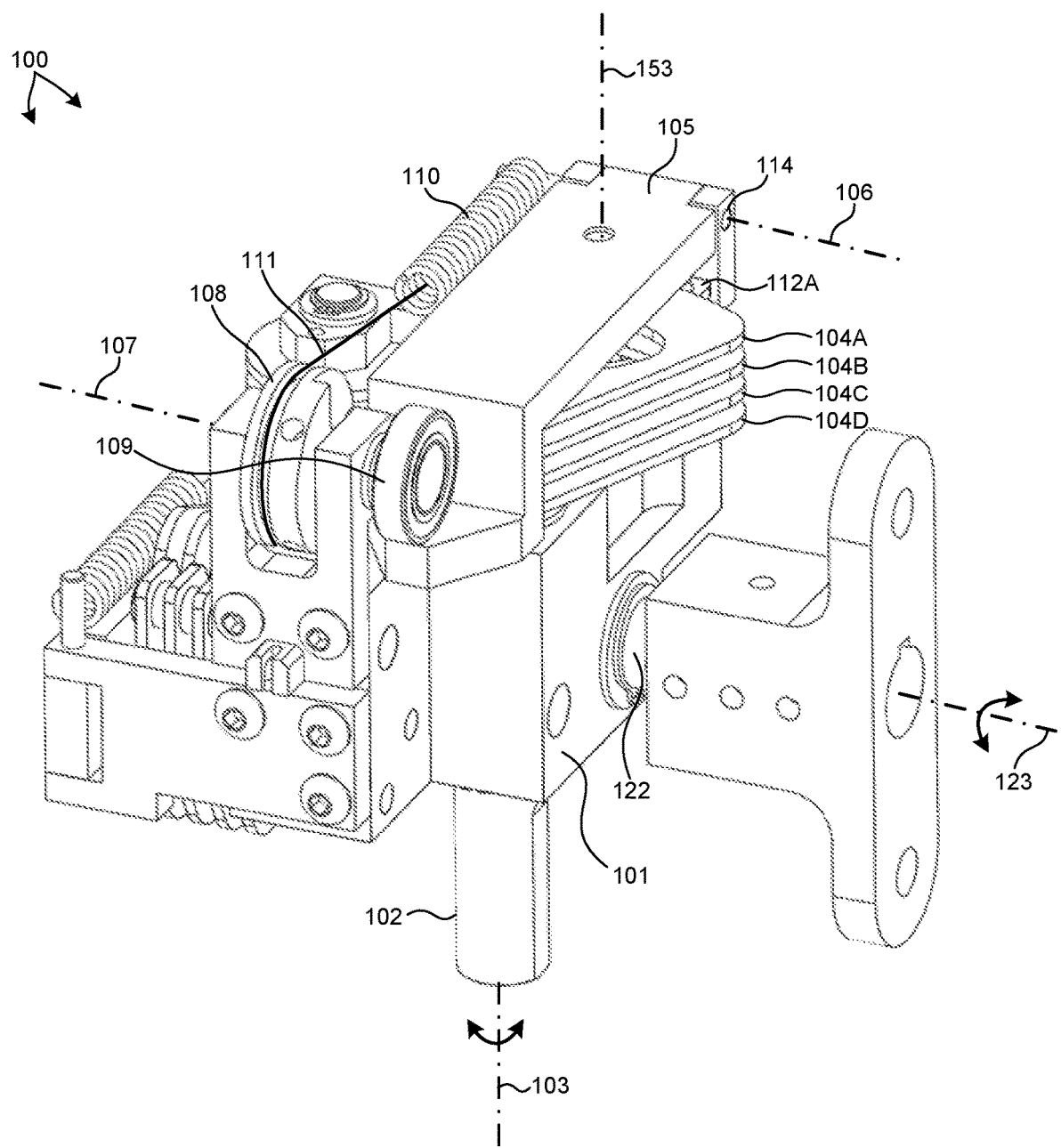
FIG. 1 is a diagram illustrative of a two degree of freedom mechanical shoulder joint and brake device 100 in one embodiment.

FIG. 1 is a diagram illustrative of a two degree of freedom mechanical shoulder joint and brake device 100 in one embodiment. Mechanical shoulder joint and brake device 100 includes a shoulder joint frame 101, mechanical shaft 102, and mechanical shaft 122. Mechanical shaft 102 rotates with respect to shoulder joint frame 101 about rotational axis 103. The remaining degrees of freedom of mechanical shaft 102 are constrained with respect to shoulder joint frame 101. Similarly, mechanical shaft 122 rotates with respect to shoulder joint frame 101 about rotational axis 123. The remaining degrees of freedom of mechanical shaft 122 are also constrained with respect to shoulder joint frame 101. In the embodiment depicted in FIG. 1, rotational axes 103 and 123 are orthogonal. However, in general, rotational axes 102 and 123 may be oriented with respect to one another at any suitable angle. In addition, although mechanical shoulder joint and brake device 100 includes two degrees of freedom, in general, a mechanical shoulder joint and brake device as described herein may in include any number of degrees of freedom, including one degree of freedom.

Figure 2:
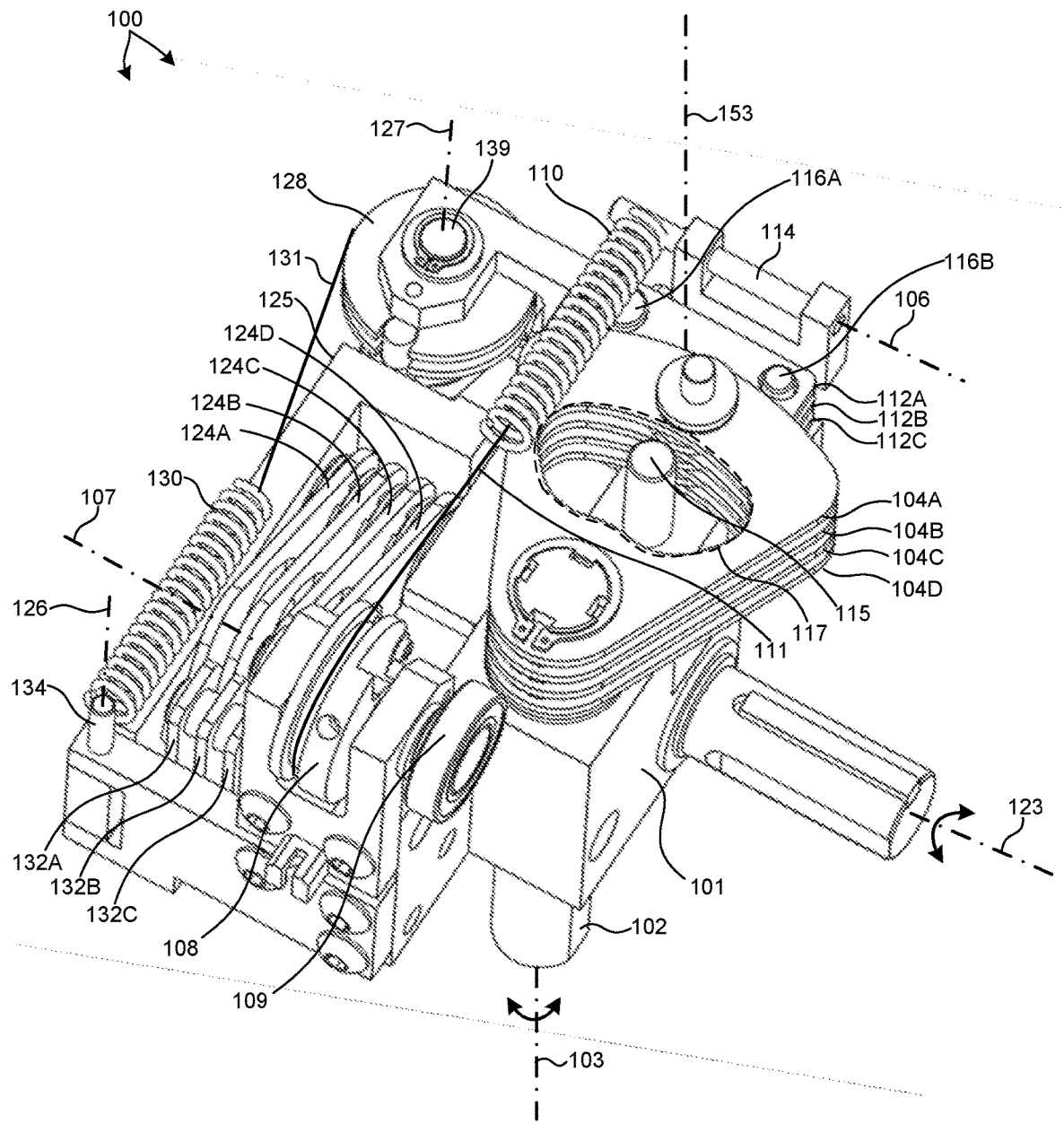
FIG. 2 is a diagram illustrative of a cutaway view of the two degree of freedom mechanical shoulder joint and brake device 100.

As depicted in FIGS. 1-6, a set of brake plates 104A-D are fixedly attached to shaft 102. Another set of brake plates 112A-C are interleaved with brake plates 104A-D. Together the interleaved sets of brake plates 104A-D and 112A-C comprise a brake assembly stack. Brake plates 112A-C are constrained by pins 116A and 116B to translate in one direction along a braking axis 153. In the embodiment depicted in FIGS. 1 and 2, braking axis 153 is parallel to rotational axis 103. Lever structure 105 is pinned to shoulder joint frame 101 by pin 106. In this manner, pin 114 constrains lever 105 to rotate about clamping axis 106. A brake force actuator mechanism is also attached to shoulder joint frame 101. The brake force actuator mechanism applies force to lever 105, which, in turn, applies force to the brake stack assembly. As depicted in FIGS. 1 and 2, clamping axis 106 is orthogonal to braking axis 153.

Figure 4:
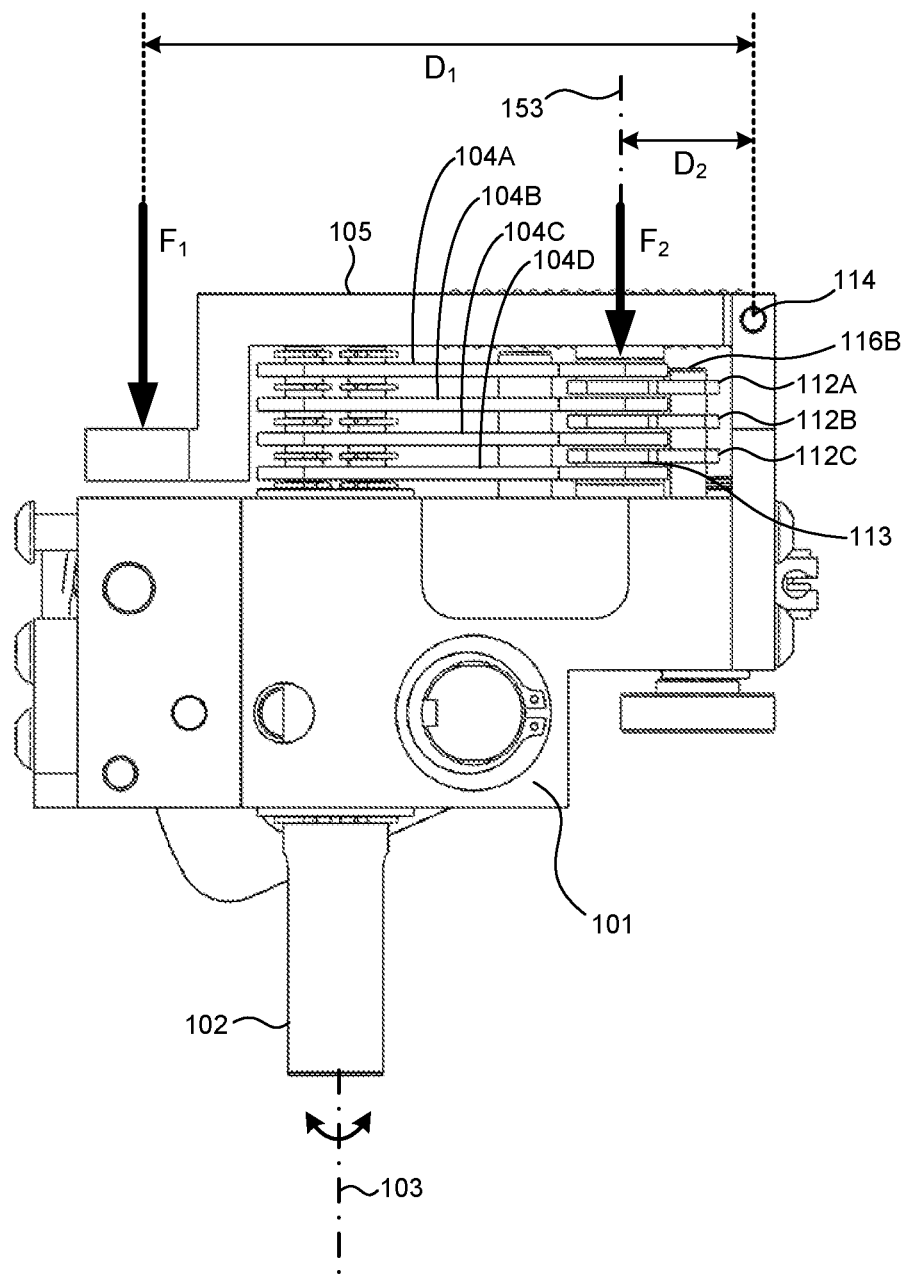
FIG. 4 is a diagram illustrative of a side view of the two degree of freedom mechanical shoulder joint and brake device 100.

FIG. 4 depicts a side view of mechanical shoulder joint and brake device 100 illustrating braking force multiplication by lever structure 105. As depicted in FIG. 4, a brake force actuator mechanism applies a force, $F_1$, to lever structure 105. This force is applied at a distance, $D_1$, from clamping axis 106. The force, $F_1$, applied to lever structure 105, induces a force, $F_2$, along the braking axis 153, which is located a distance, $D_2$, from clamping axis 106. In this manner, lever structure 105 is a force multiplier as described by equation (1).

$$\frac{F_2}{F_1} = \frac{D_1}{D_2} \qquad (1)$$

Figure 5:
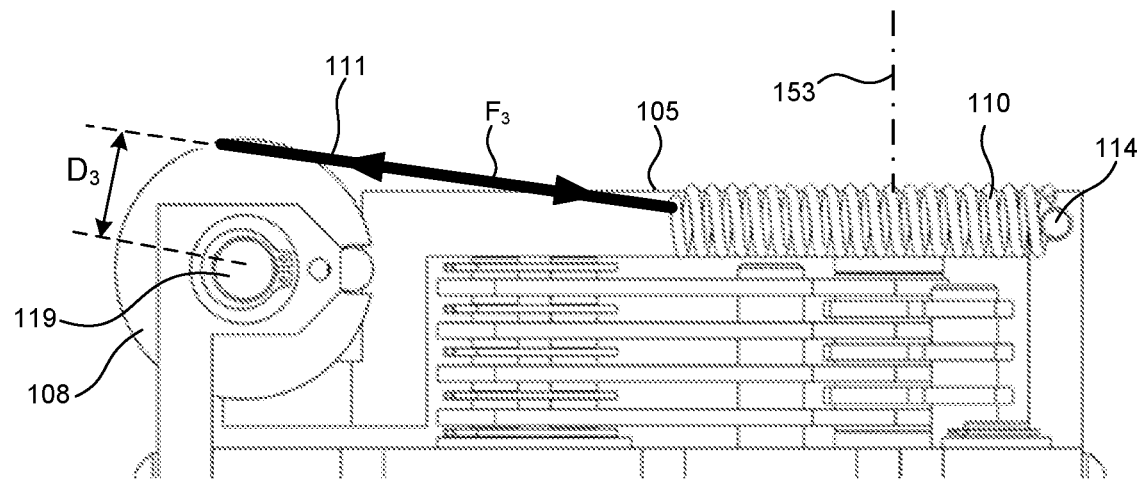
FIG. 5 is a diagram illustrative of another side view of the two degree of freedom mechanical shoulder joint and brake device 100.
Figure 6:
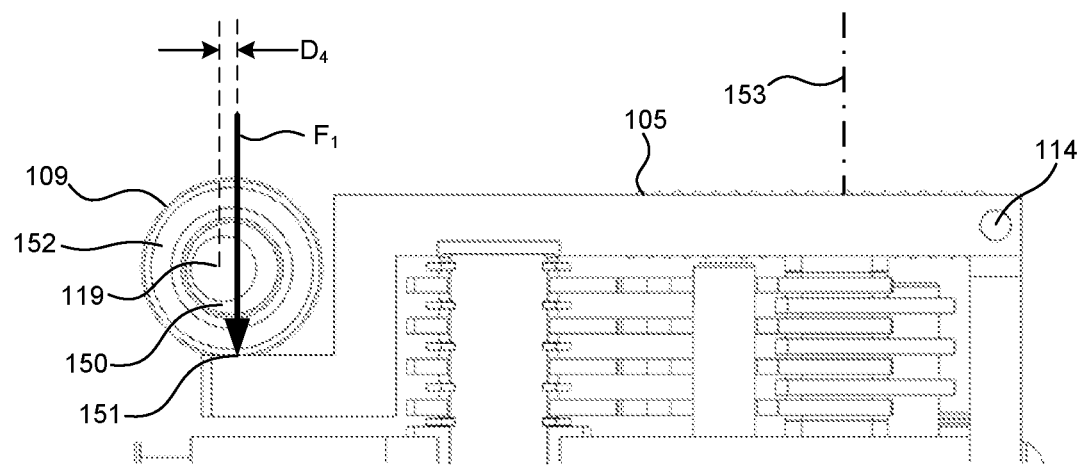
FIG. 6 is a diagram illustrative of yet another side view of the two degree of freedom mechanical shoulder joint and brake device 100.

FIGS. 1, 5, and 6 also depict elements of the brake force actuator mechanism including a spring element 110, cable 111, pulley 108, shaft 119, and eccentric wheel 109. As depicted in FIGS. 1, 5, and 6, one end of spring element 110 is coupled to shoulder joint frame 101 and the opposite end is coupled to cable 111. Spring element 110 is placed in tension, and thus applies a tensile force, $F_3$, at the perimeter of pulley 108 via cable 111. Pulley 108 is attached to shaft 119, along with eccentric mechanism 109. In this manner, the shaft assembly, including pulley 108, shaft 119, and eccentric mechanism 109, is constrained to rotate with respect to the shoulder joint frame about brake force actuator axis 107. In the embodiments depicted in FIGS. 1, 5, and 6, the brake force actuator axis 107 is parallel to clamping axis 106. The perimeter of eccentric mechanism 109 is in contact with lever 105 at contact area 151. As depicted in FIG. 6, the eccentric mechanism applies contact force, $F_1$, to lever 105 over contact area 151.

As depicted in FIG. 6, eccentric mechanism 109 includes a bearing 152 pressed onto an eccentric spacer 150, which is, in turn, pressed onto shaft 119. As depicted in FIG. 6, the center of the hole of eccentric spacer 150 fixed to shaft 119 is misaligned from the center of the perimeter of eccentric spacer 150 fixed to bearing 152 by a distance $D_4$. In this manner, a rotation of shaft 119 induces a translation at contact area 151 in a direction parallel to braking axis 153. In other embodiments, an eccentric shaft (e.g., camshaft) may be employed as eccentric mechanism 109. In other embodiments, an eccentric wheel pressed onto shaft 119 is employed as eccentric mechanism 109. In general, any suitable mechanism to translate rotation of shaft 119 into a translational displacement of lever 105 at contact area 151 may be contemplated within the scope of this patent document.

As depicted in FIGS. 5 and 6, the tensile force, $F_3$, applied to pulley 108, induces a torque about shaft 119, which, absent motion, is counterbalanced by the torque induced by the reaction force, $F_1$ acting at a distance, $D_4$/from axis 107, e.g., the center of shaft 119. In this manner, the brake force actuator mechanism is a force multiplier as described by equation (2).

$$\frac{F_1}{F_3} = \frac{D_3}{D_4} \qquad (2)$$

Combining the force multiplier effects of both lever structure 105 and the brake force actuator mechanism, the total force multiplication from force, $F_3$, applied by spring 110 to braking force, $F_2$, applied along brake axis 153 is described by equation (3).

$$\frac{F_2}{F_3} = \left(\frac{D_1}{D_2}\right)\left(\frac{D_3}{D_4}\right) \qquad (3)$$

Also depicted in FIGS. 1 and 2, a set of brake plates 124A-D are fixedly attached to shaft 122. Another set of brake plates 132A-C are interleaved with brake plates 124A-D. Together the interleaved sets of brake plates 124A-D and 132A-C comprise a brake assembly stack. Lever structure 125 is pinned to shoulder joint frame 101 by pin 134. In this manner, pin 134 constrains lever 125 to rotate about clamping axis 126. A brake force actuator mechanism including shaft 139, pulley 128, cable 131, and spring 130 is also attached to shoulder joint frame 101. As depicted in FIG. 2, pulley 128 and shaft 139 are constrained to rotate with respect to the shoulder joint frame 101 about brake force actuator axis 127. The brake force actuator mechanism applies force to lever 125 as described hereinbefore.

As described hereinbefore, the braking force, $F_2$, applied to the braking system by spring 110 is multiplied by lever structure 105 and brake force actuator mechanism. In a further aspect, the braking force, $F_2$, applied by spring 110 is manually reduced or released to a zero value by a human user.

Figure 8:
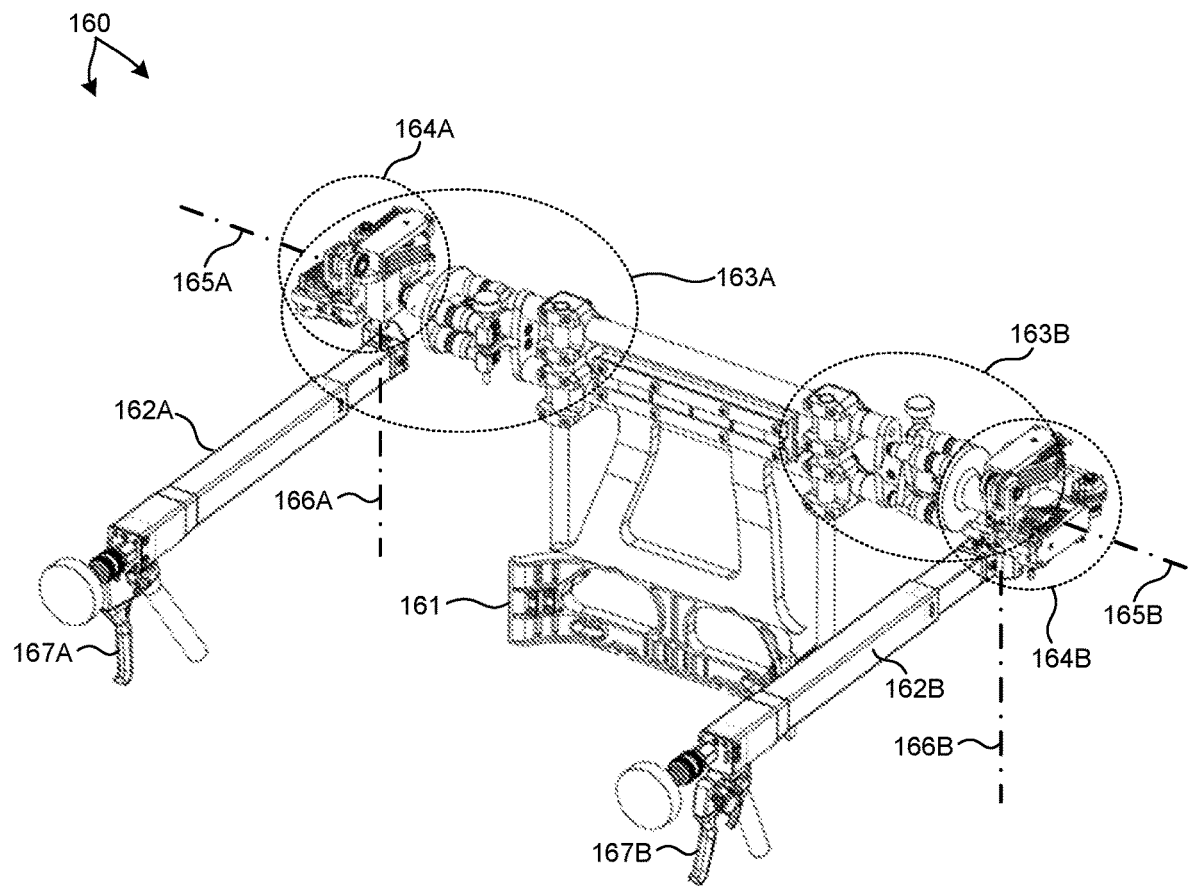
FIG. 8 is a diagram illustrative of an upper body support system 160 including two mechanical shoulder joint and brake devices each including two degrees of freedom.
Figure 9:
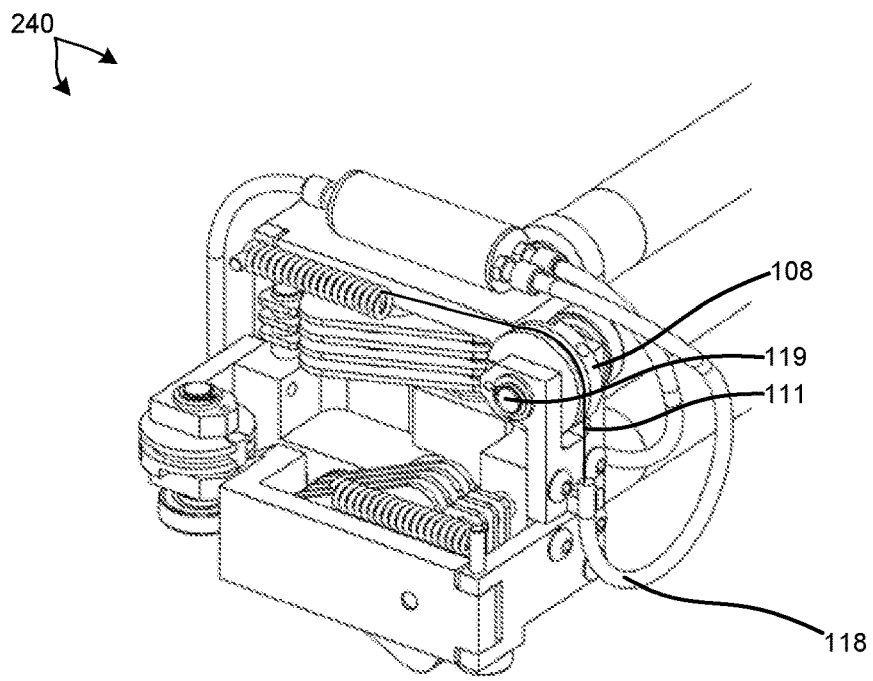
FIG. 9 is a diagram illustrative of a zoomed view of the two degree of freedom mechanical shoulder joint and brake device 100.

FIG. 9 depicts cable 111 attached to pulley 108. However, in addition, cable 111 extends into a sheath 118 that itself extends to a manual brake control lever (e.g., manual brake control lever 167A depicted in FIG. 8). In this manner, a human user can increase the tensile force in cable 111, which deforms spring element 110 and releases the braking force, $F_2$.

In another aspect, each degree of freedom of the mechanical shoulder joint and brake device includes a stopper structure to limit the range of rotation of a particular rotational joint. In the embodiment depicted in FIG. 2, a stopper pin 115 is coupled to shoulder joint frame 101. Stopper pin 115 extends through an aperture (i.e., opening 117) in one or more of brake plates 104A-D. At the limits of the workspace of rotational shaft 102, stopper pin 115 makes contact with one or more of brake plates 104A-D, and stops further motion in one direction. At the opposite end of the workspace, stopper pin 115 makes contact with one or more of brake plates 104A-D, and stops further motion in the opposite direction.

In another aspect, a friction enhancing material is bonded to one or more of the brake plates to increase the braking torque induced at each rotational joint for a given brake force.

Specific embodiments are presented herein by way of non-limiting example. In general, many different designs may be employed to achieve the functionality described herein. In one example, the number of interleaved brake plates may be any suitable integer number. In general, as the number of brake plate is increased, the braking torque induced at each rotational joint is increased for a given brake force.

Figure 3:
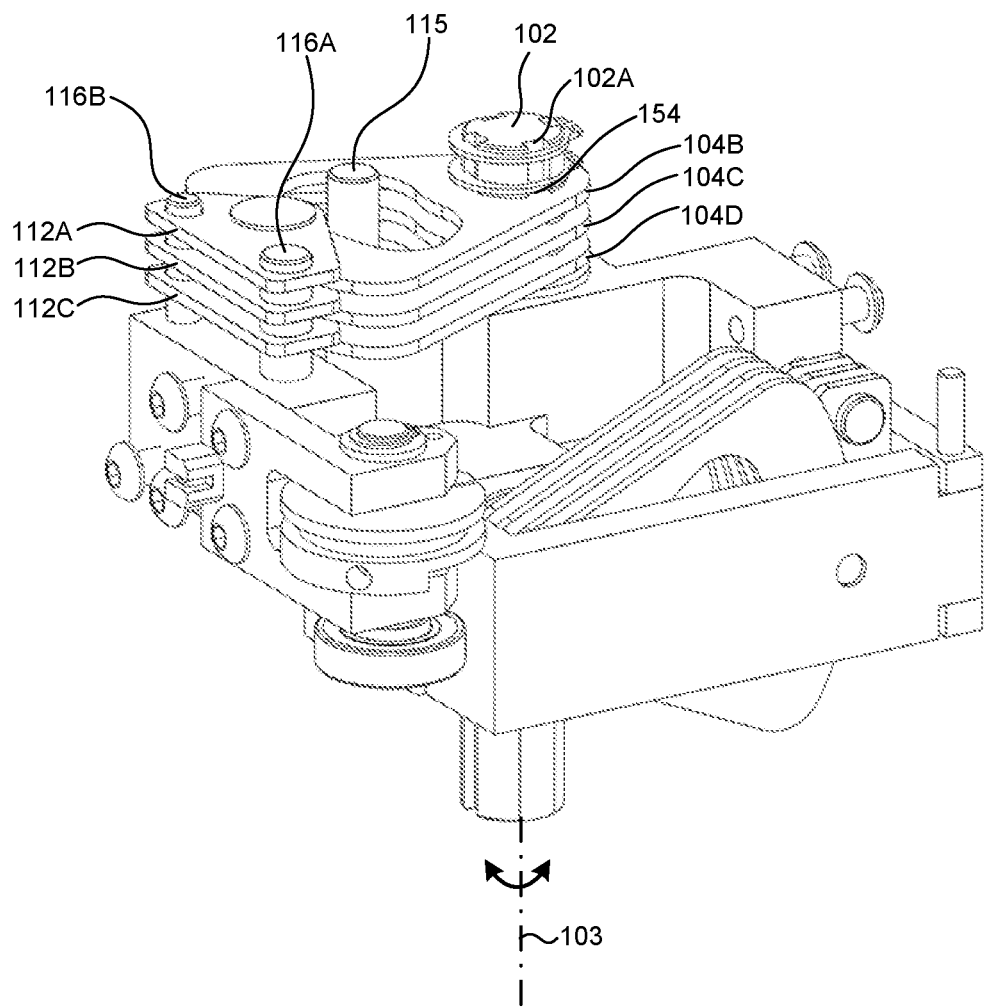
FIG. 3 is a diagram illustrative of another cutaway view of the two degree of freedom mechanical shoulder joint and brake device 100.

In general, brake plates, such as brake plates 104A-D may be attached to shaft structure 102 in any suitable manner. As depicted in FIG. 3, shaft 102 includes four keyways (e.g., keyway 102A) that run along the shaft in the axial direction. Each brake plate includes a corresponding tab (e.g,. tab 154) that fits into a keyway (e.g., keyway 102A) and effectively constrains each brake plate to rotate with shaft 102. Other fitment approaches, such as splines, weldment, press fit, etc., may also be contemplated within the scope of this patent document.

Figure 7:
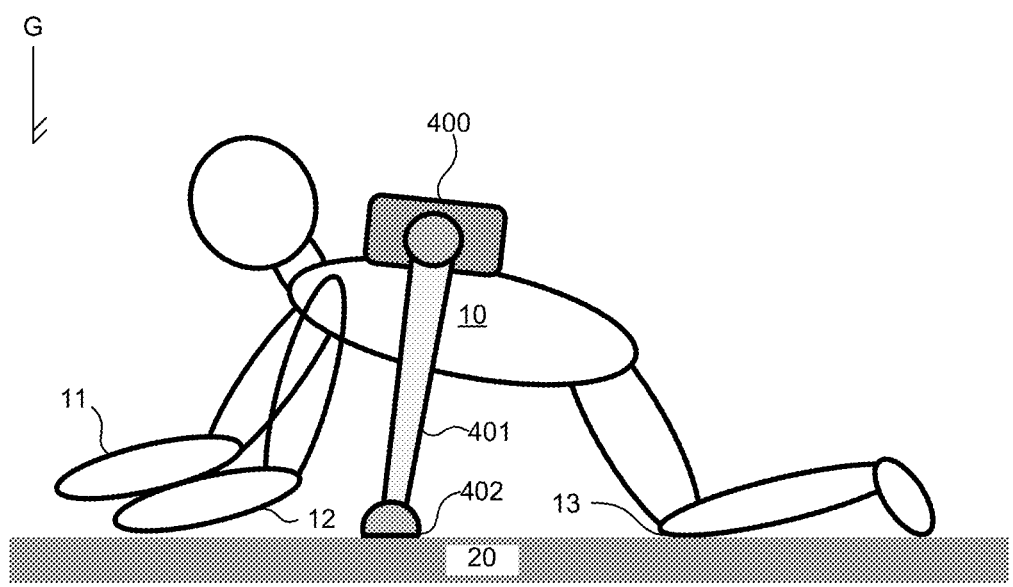
FIG. 7 is a diagram illustrative of an upper body support system 400 in one operational scenario.

FIG. 7 is a diagram illustrative of an upper body support system 400 in one operational scenario.

Upper body support system 400 passively supports the upper body of a human user working at or near the ground. In one aspect, upper body support system 400 braces the torso of a human user against a surface of the work environment. This frees the hands and arms of the human user that would otherwise be occupied supporting the human torso. Thus, a human user is able to comfortably use both hands to execute a particular work task.

The upper body support system includes one or more upper body support assemblies 401 each including an extensible body support limb that extends toward the surface of the working environment and supports the human user. In some embodiments, the nominal length of the extensible body support limb is adjustable.

In one aspect, each upper body support assembly includes a mechanical shoulder joint and brake device coupled to a frame of the upper body support system as described herein. In this manner, a mechanical shoulder joint and brake device is disposed in each structural path between the harness assembly and a surface of a working environment. The mechanical shoulder joint and brake device allows the extensible body support limb to freely rotate with respect to the frame in at least one degree of freedom when a human user releases the brake force to adjust the position of the upper body support assembly. In this manner the human user can move the upper body freely to change posture. When the human user finds a suitable position, the human user allows the spring element to reapply the brake force and hold the position of the upper body support assembly. In general, the braking force applied by the spring element is adjustable to accommodate the preferences and working conditions of the human user.

As depicted in FIG. 7, upper body support system 400 is attached to the torso 10 of a human user with a harness assembly. Two upper body support assemblies 401 are coupled to the harness assembly, one on each side of the body of the human user (i.e., in the direction perpendicular to the drawing sheet). As depicted in FIG. 7, the human user is working on the ground surface 20 oriented perpendicular to the gravity vector, G. The human user is stably supported at the ground surface at contact areas 13 associated with each knee and at contact areas 402 associated with each upper body support assembly 401. As depicted in FIG. 7, the upper body of the human user is stably supported by upper body support system 400 without the use of hands 11 and 12. In this manner both hands 11 and 12 are available to perform a task at or near the ground surface 20.

In the example depicted in FIG. 7, the upper body support system 400 is located near the center of mass of the human torso, and is configured to support most of the weight associated with the human torso. This reduces the loading on the knees, feet, and back of the human user compared to crouching or kneeling in a conventional manner. As depicted in FIG. 7, the knees of the human user are comfortably posed, for example at angles between ninety degrees and one hundred thirty five degrees. The knees do not have to be bent sharply at acute angles to stably support the human body. By distributing the weight of the human body over the passive upper body support assemblies 401, the total amount of load carried by the knees and the severity of the pose required to stably support the human body are significantly reduced.

In general, an upper body support system 400 may employ any number of passive upper body support assemblies. In addition, the upper body support system 400 may be located in any suitable location with respect to the human torso. However, it is preferable to locate the upper body support system 400 in a location that stably supports the human body weight, while minimizing the weight supported by other members of the human body, such as the knees or feet.

FIG. 8 is a diagram illustrative of an upper body support system 160 including two mechanical shoulder joint and brake devices each including two degrees of freedom. Upper body support system 160 includes a harness assembly 161 and two upper body support assemblies including shoulder joints 163A-B and extensible body support limbs 162A-B, respectively. Harness assembly 161 includes a vest (not shown) tailored to fit the human user. A human user dons the vest in a conventional manner and cinches the vest onto his/her body using locking mechanisms (e.g., buckles, cinch straps, etc.). The upper body support assemblies are each coupled to harness assembly 161. The shoulder joints 163A-B of each respective upper body support assembly include a two degree of freedom mechanical shoulder joint and brake device 164A-B. Extensible body support limb 162A rotates about a rotational joint axis 165A and a rotational joint axis 166A of mechanical shoulder joint and brake device 164A. Similarly, extensible body support limb 162A rotates about a rotational joint axis 165B and a rotational joint axis 166B of mechanical shoulder joint and brake device 164B.

Figure 10:
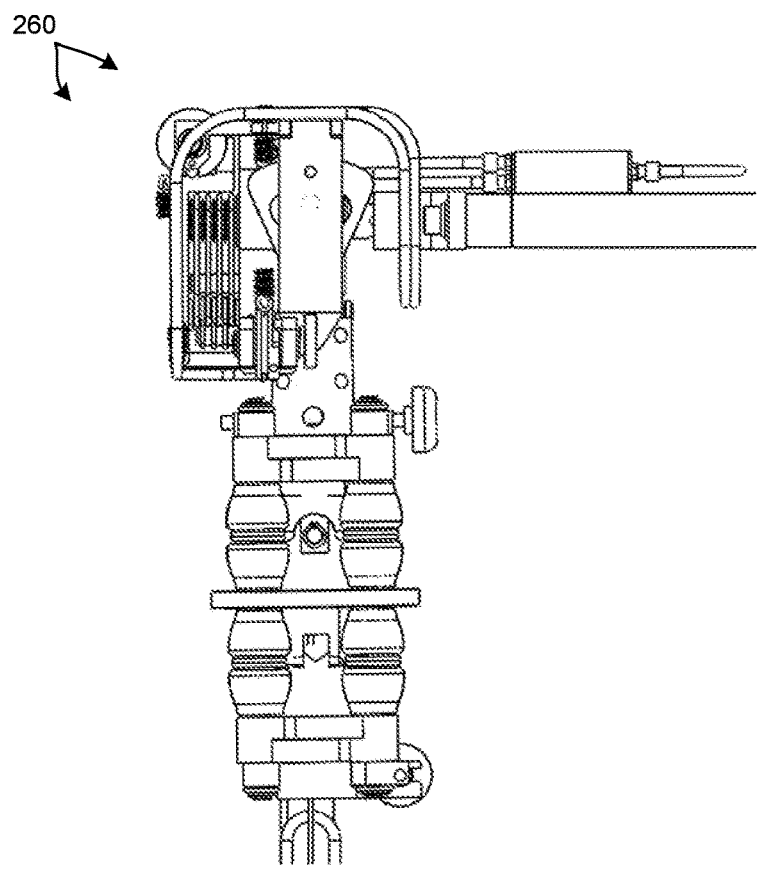
FIG. 10 is a diagram illustrative of the two degree of freedom mechanical shoulder joint and brake device 100 integrated with an upper body support system.

FIG. 10 is an image 240 illustrative of an upper body support system including a two degree of freedom mechanical shoulder joint and brake device such as two degree of freedom mechanical shoulder joint and brake device 100 depicted in FIGS. 1-6.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A mechanical shoulder joint and brake device, comprising:
   a shoulder joint frame;
   a first mechanical shaft structure constrained to rotate with respect to the shoulder joint frame about a first shoulder joint axis;
   a first brake stack including:
   a first plurality of brake plates fixedly coupled to the first mechanical shaft structure;
   a second plurality of brake plates interleaved with the first plurality of brake plates, the second plurality of brake plates constrained to translate with respect to the shoulder joint frame along a first braking axis;
   a first lever structure constrained to rotate with respect to the shoulder joint frame about a first clamping axis, the first clamping axis orthogonal to the first braking axis, the first lever structure in mechanical contact with the first braking stack at a first distance from the first clamping axis;
   a first brake force actuator attached to the shoulder joint frame, the first brake force actuator in mechanical contact with the first lever structure at a second distance from the first clamping axis, wherein the second distance is greater than the first distance; and
   a brake force actuator shaft constrained to rotate with respect to the shoulder joint frame about a first brake force actuator axis, the brake force actuator axis parallel to the first clamping axis.

2. The mechanical shoulder joint and brake device of claim 1, the brake force actuator, comprising:
   a linear force generator coupled to the brake force actuator shaft at a third distance from the brake force actuator axis; and
   an eccentric structure coupled to the brake force actuator shaft, the eccentric structure in mechanical contact with the first lever structure, the brake force actuator axis offset from a central axis of the eccentric structure by a fourth distance.

3. The mechanical shoulder joint and brake device of claim 2, the linear force generator including:
   a pulley fixedly coupled to the brake force actuator shaft;
   a spring having a first mechanical coupling node and a second mechanical coupling node opposite the first mechanical coupling node, the spring coupled to the shoulder joint frame at the first mechanical coupling node; and
   a first cable coupled between the second mechanical coupling node of the spring and the pulley, wherein the spring maintains tension in the first cable.

4. The mechanical shoulder joint and brake device of claim 3, further comprising:
   a brake control lever coupled to the first cable such that a tension in the first cable is adjusted based on a displacement of the brake control lever.

5. The mechanical shoulder joint and brake device of claim 4, wherein
   the displacement of the brake control lever is generated by a human user.

6. The mechanical shoulder joint and brake device of claim 1,
   further comprising:
   a second mechanical shaft structure constrained to rotate with respect to the shoulder joint frame about a second shoulder joint axis;
   a second brake stack including:
   a third plurality of brake plates fixedly coupled to the second mechanical shaft structure;
   a fourth plurality of brake plates interleaved with the third plurality of brake plates, the fourth plurality of brake plates constrained to translate with respect to the shoulder joint frame along a second braking axis;
   a second lever structure constrained to rotate with respect to the shoulder joint frame about a second clamping axis, the second clamping axis orthogonal to the second braking axis, the second lever structure in mechanical contact with the second braking stack at a fifth distance from the second clamping axis;
   a second brake force actuator attached to the shoulder joint frame, the second brake force actuator in mechanical contact with the second lever structure at a sixth distance from the second clamping axis, wherein the sixth distance is greater than the fifth distance.

7. The mechanical shoulder joint and brake device of claim 6, wherein
the first shoulder joint axis and the second shoulder joint axis are orthogonal.

8. The mechanical shoulder joint and brake device of claim 1, wherein
the first mechanical shaft structure is coupled to an upper body support frame.

9. The mechanical shoulder joint and brake device of claim 1, further comprising:
a stopper pin fixedly attached to the shoulder joint frame, wherein at least one of the first plurality of brake plates includes an aperture, wherein the stopper pin extends into the aperture, and wherein a rotation of the first mechanical shaft structure with respect to the shoulder joint frame is limited to a range of rotational orientations between two different orientations, wherein the stopper pin is in contact with the at least one of the first plurality of brake plates at each of the two different orientations.

10. The mechanical shoulder joint and brake device of claim 1, further comprising:
an amount of frictional material bonded to one or more of the first plurality of brake plates, one or more of the second plurality of brake plates, or a combination thereof.

11. An upper body support system comprising:
a harness assembly couplable to a torso of a human user;
a plurality of upper body support assemblies each coupled to the harness assembly, wherein a first of the plurality of upper body support assemblies is coupled to the harness assembly on a first side of the torso of the human user, and wherein a second of the plurality of upper body support assemblies is coupled to the harness assembly on a second side of the torso of the human user opposite the first side, wherein each of the plurality of upper body support assemblies includes:
a mechanical shoulder joint and brake device, comprising:
a shoulder joint frame;
a first mechanical shaft structure constrained to rotate with respect to the shoulder joint frame about a first shoulder joint axis;
a first brake stack including:
a first plurality of brake plates fixedly coupled to the first mechanical shaft structure;
a second plurality of brake plates interleaved with the first plurality of brake plates, the second plurality of brake plates constrained to translate with respect to the shoulder joint frame along a first braking axis;
a first lever structure constrained to rotate with respect to the shoulder joint frame about a first clamping axis, the first clamping axis orthogonal to the first braking axis, the first lever structure in mechanical contact with the first braking stack at a first distance from the first clamping axis; and
a first brake force actuator attached to the shoulder joint frame, the first brake force actuator in mechanical contact with the first lever structure at a second distance from the first clamping axis, wherein the second distance is greater than the first distance.

12. The upper body support system of claim 11, the brake force actuator, comprising:
a brake force actuator shaft constrained to rotate with respect to the shoulder joint frame about a first brake force actuator axis, the brake force actuator axis parallel to the first clamping axis;
a linear force generator coupled to the brake force actuator shaft at a third distance from the brake force actuator axis; and
an eccentric structure coupled to the brake force actuator shaft, the eccentric structure in mechanical contact with the first lever structure, the brake force actuator axis offset from a central axis of the eccentric structure by a fourth distance.

13. The upper body support system of claim 12, the linear force generator including:
a pulley fixedly coupled to the brake force actuator shaft;
a spring having a first mechanical coupling node and a second mechanical coupling node opposite the first mechanical coupling node, the spring coupled to the shoulder joint frame at the first mechanical coupling node; and
a first cable coupled between the second mechanical coupling node of the spring and the pulley, wherein the spring maintains tension in the first cable.

14. The upper body support system of claim 13, further comprising:
a brake control lever coupled to the first cable such that a tension in the first cable is adjusted based on a displacement of the brake control lever.

15. The upper body support system of claim 14, wherein the displacement of the brake control lever is generated by a human user.

16. The upper body support system of claim 11, further comprising:
a stopper pin fixedly attached to the shoulder joint frame, wherein at least one of the first plurality of brake plates includes an aperture, wherein the stopper pin extends into the aperture, and wherein a rotation of the first mechanical shaft structure with respect to the shoulder joint frame is limited to a range of rotational orientations between two different orientations, wherein the stopper pin is in contact with the at least one of the first plurality of brake plates at each of the two different orientations.

17. The upper body support system of claim 11, further comprising:
an amount of frictional material bonded to one or more of the first plurality of brake plates, one or more of the second plurality of brake plates, or a combination thereof.

18. A system, comprising:
a frame;
a first shaft constrained to rotate with respect to the frame about a first axis;
a first brake stack including:
a first plurality of brake plates fixedly coupled to the first shaft;
a second plurality of brake plates interleaved with the first plurality of brake plates, the second plurality of brake plates constrained to translate with respect to the frame along a first braking axis;
a first lever constrained to rotate with respect to the frame about a first clamping axis, the first lever in mechanical contact with the first braking stack at a first distance from the first clamping axis; and
a first brake force actuator attached to the frame, the first brake force actuator in mechanical contact with the first lever structure at a second distance from the first clamping axis, wherein the second distance is greater than the first distances;
a second shaft constrained to rotate with respect to the frame about a second axis;

a second brake stack including:
- a third plurality of brake plates fixedly coupled to the second shaft;
- a fourth plurality of brake plates interleaved with the third plurality of brake plates, the fourth plurality of brake plates constrained to translate with respect to the frame along a second braking axis;

a second lever constrained to rotate with respect to the frame about a second clamping axis, the second clamping axis orthogonal to the second braking axis, the second lever in mechanical contact with the second braking stack at a third distance from the second clamping axis;

a second brake force actuator attached to the frame, the second brake force actuator in mechanical contact with the second lever at a fourth distance from the second clamping axis, wherein the fourth distance is greater than the third distance.

19. The system of claim 18, wherein the first axis is orthogonal to the second axis.

\* \* \* \* \*